(12) United States Patent
Dowdall et al.

(10) Patent No.: US 12,084,060 B2
(45) Date of Patent: Sep. 10, 2024

(54) ASSOCIATING IMAGE DATA AND DEPTH DATA FOR DEPTH DETERMINATION

(71) Applicant: Zoox, Inc., Foster City, CA (US)

(72) Inventors: Jonathan Tyler Dowdall, San Francisco, CA (US); Kratarth Goel, Albany, CA (US); Adam Edward Pollack, San Francisco, CA (US); Scott M. Purdy, Lake Forest Park, WA (US); Bharadwaj Raghavan, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 417 days.

(21) Appl. No.: 17/478,602

(22) Filed: Sep. 17, 2021

(65) Prior Publication Data

US 2023/0091924 A1 Mar. 23, 2023

(51) Int. Cl.
*G06T 7/55* (2017.01)
*B60W 40/02* (2006.01)
(Continued)

(52) U.S. Cl.
CPC ............ *B60W 40/02* (2013.01); *B60W 50/06* (2013.01); *B60W 60/0015* (2020.02); *G01S 17/894* (2020.01); *G06T 7/11* (2017.01); *G06T 7/30* (2017.01); *G06T 7/55* (2017.01); *B60W 30/0956* (2013.01); *B60W 2420/408* (2024.01);
(Continued)

(58) Field of Classification Search
CPC .. B60W 40/02; B60W 60/0015; B60W 50/06; B60W 2420/52; B60W 30/0956; G06T 7/30; G06T 7/11; G06T 7/55; G06T 2207/30252; G06T 2207/20081; G06T 2207/20084; G06T 2207/10028; G01S 17/42; G01S 7/4808; G01S 17/894; G01S 17/86; G01S 17/931
See application file for complete search history.

(56) References Cited

U.S. PATENT DOCUMENTS 9,525,862 B2 * 12/2016 Benhimane .......... H04N 13/221
10,937,178 B1 3/2021 Srinivasan
(Continued)

FOREIGN PATENT DOCUMENTS

WO WO-2015043872 A1 * 4/2015 ............... G06T 7/77

OTHER PUBLICATIONS

Machine description of WO 2015043872 A1, Engel et al. (Year: 2015).*
(Continued)

*Primary Examiner* — Anne Marie Antonucci
*Assistant Examiner* — Jared C Bean
(74) *Attorney, Agent, or Firm* — Lee & Hayes, P.C.

(57) ABSTRACT

Techniques for utilizing a depth completion algorithm to determine dense depth data are discussed are discussed herein. Two-dimensional image data representing an environment can be captured or otherwise received. Depth data representing the environment can be captured or otherwise received. The depth data can be projected into the image data and processed using the depth completion algorithm. The depth completion algorithm can be utilized to determine the dense depth values based on intensity values of pixels, and other depth values. A vehicle can be controlled based on the determined depth values.

20 Claims, 5 Drawing Sheets

(51) Int. Cl.
  *B60W 50/06* (2006.01)
  *B60W 60/00* (2020.01)
  *G01S 17/894* (2020.01)
  *G01S 17/931* (2020.01)
  *G06T 7/11* (2017.01)
  *G06T 7/30* (2017.01)
  *B60W 30/095* (2012.01)

(52) U.S. Cl.
  CPC ... *G01S 17/931* (2020.01); *G06T 2207/10028* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 10,972,638 B1* | 4/2021 | Waschura | G06T 5/005 |
| 10,983,217 B2 | 4/2021 | Nezhadarya | |
| 11,042,966 B2 | 6/2021 | Chen | |
| 2016/0084956 A1* | 3/2016 | Stainvas Olshansky | G01S 13/58 342/195 |
| 2020/0160559 A1 | 5/2020 | Urtasun | |
| 2020/0193630 A1* | 6/2020 | Mousavian | G06N 3/084 |

OTHER PUBLICATIONS

PCT Search Report and Written Opinion mailed Dec. 16, 2022 for PCT Application No. PCT/US22/42507, 12 pages.

* cited by examiner

ASSOCIATING IMAGE DATA AND DEPTH DATA FOR DEPTH DETERMINATION

BACKGROUND

Autonomous vehicles can capture and use various sensor data to detect objects and determine routes through physical environments. For instance, an autonomous vehicle can capture sensor data, such as image data, lidar data, radar data, audio data, time of flight data, and the like, utilizing sensors of the autonomous vehicle. In some examples, limited range and/or low density of sensor data may reduce accuracy, quality, and precision of object information associated with a surrounding environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
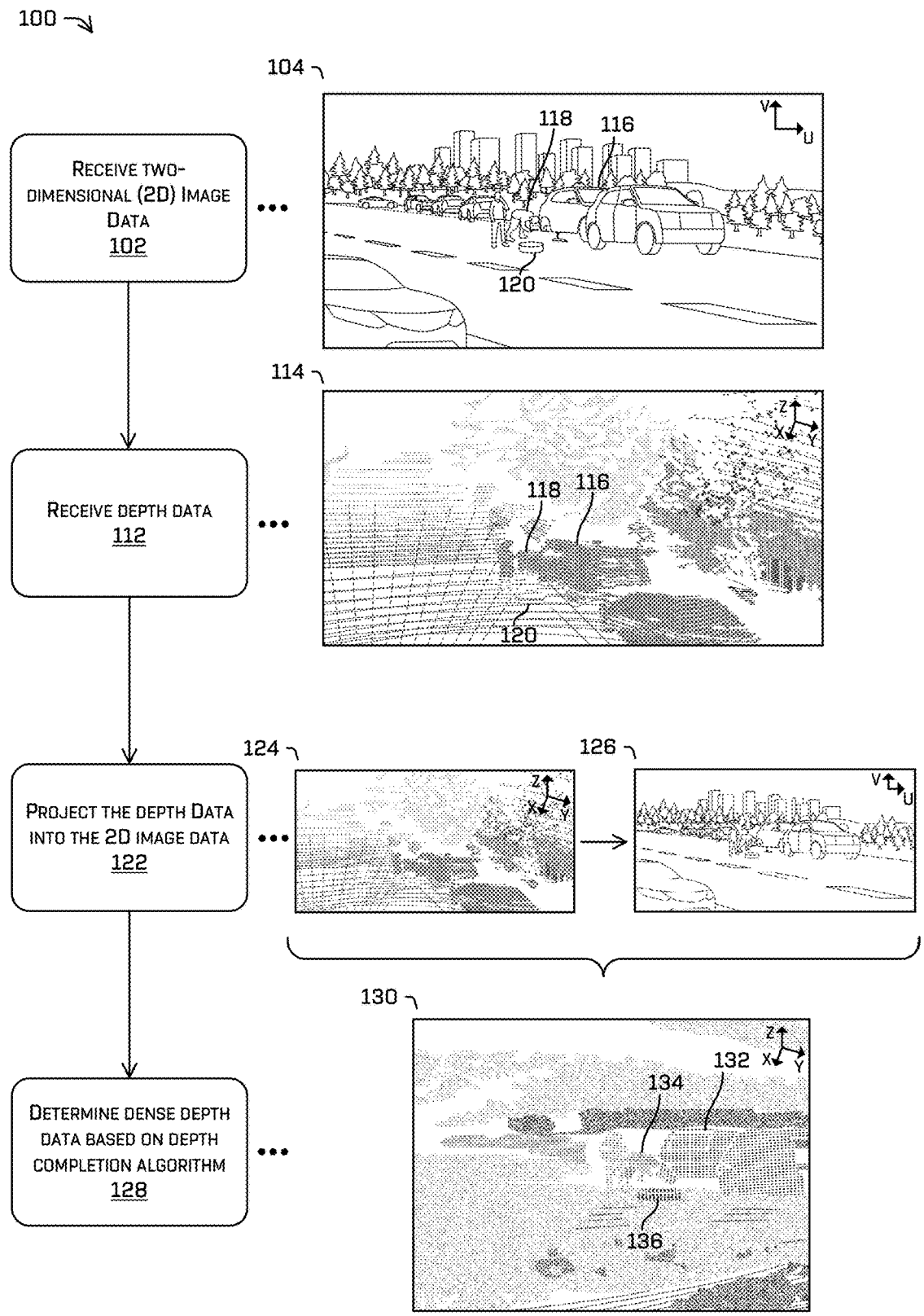
FIG. 1 is a pictorial flow diagram of an example process for utilizing a depth completion algorithm to process sensor data, as described herein.

Techniques for associating depth data with image data and determining dense depth data based on a depth completion algorithm are discussed herein. In some examples, an image sensor can capture two-dimensional image data representing an environment. In some examples, a lidar sensor can capture depth data representing the environment. The depth data can be projected into the image data and processed utilizing the depth completion algorithm, which may be a least squares optimization and/or machine learning model(s). Accordingly, sparse lidar data can be used to determine dense depth data for image data, which can be precisely aligned for subsequent processing. In some cases, a vehicle can be controlled based on the dense depth values.

The depth data can be projected into the image data to densify the depth data. The depth data being projected into the image data can be utilized to determine the other depth values associated with the other pixels. The depth values and the intensity values of the pixels can be utilized, along with the depth completion algorithm (e.g., a least squares optimization algorithm), to determine the other depth values. The other depth values can be determined based on weights associated with the intensity values of the pixels. In some examples, a weight can be determined based on a difference between an intensity value and another intensity value of the intensity data associated with another pixel. A relationship between weight(s) associated with intensity values of the pixels can be determined. The depth value, along with the weight associated with the intensity values, can be utilized to determine the other depth value. The depth data can be densified based on the other depth value.

Information associated with objects in the environment can be determined based on the densified depth data and utilized to control the vehicle. The depth value and the other depth value associated with the densified depth data can be utilized to determine a three-dimensional (3D) bounding box associated with an object. The bounding box can represent a location, an extent (e.g., a length and a width), and a classification (e.g., a vehicle, a pedestrian, and the like) of the object in the environment. Information (e.g., a velocity, an acceleration, a signal (e.g., blinker) status, and the like) associated with the bounding box can be determined based on the densified depth data and/or based on the associated image data. The vehicle can be controlled based on the bounding box and the information associated with the bounding box.

The techniques discussed herein can improve a functioning of a computing device in a number of additional ways. In some cases, techniques for sensor data determination with a depth completion algorithm can be utilized to represent the environment without performing other more resource-intensive processing tasks. By decreasing the amount of processing that is required for determining sensor data, freed up processing resources can be reallocated to other tasks. The vehicle receives the sensor data determined utilizing the depth completion algorithm can be controlled more safely. The vehicle can be controlled with higher precision with respect to objects in the environment, thereby decreasing the risk of collisions with the objects. The vehicle can be controlled with greater efficiency by more accurately determining information associated with objects earlier on in a trajectory of the vehicle. A more conservative trajectory that reduces an amount of strain to equipment of the vehicle can be utilized based on the object information being determined earlier on in the vehicle trajectory.

Furthermore, the vehicle can determine a trajectory from among a larger number of available trajectories based on the sensor data determined utilizing the depth completion algorithm. The larger number of available trajectories may otherwise be unavailable in circumstances in which other technologies are utilized to determine the sensor data. The trajectories may be unavailable due to the vehicle being positioned closer to the object by the time the vehicle is able to determine the object information utilizing the other techniques. The vehicle can be controlled with greater efficiency by utilizing the depth completion algorithm to determine the depth data according to the techniques discussed here. The vehicle can be controlled based on the depth data being determined by utilizing the depth completion algorithm vehicle to increase lifespans of vehicle components and conserve energy resources of the vehicle that would otherwise be required for determining the trajectory of the vehicle.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configured to determine depth data of an environment. Additionally, the techniques described herein can be used with real data (e.g., captured using sensor(s)), simulated data (e.g., generated by a simulator), or any combination of the two.

FIG. 1 is a pictorial flow diagram of an example process 100 for utilizing a depth completion algorithm to process sensor data, as described herein. Process 100, and various other examples herein, may be described in reference to performing dense depth data determination functionalities by a vehicle (e.g., an autonomous vehicle) travelling through an environment.

At operation 102, a sensor (e.g., an image sensor) can capture two-dimensional (2D) image data representing an environment. The image data can include pixels (e.g., a first pixel and a second pixel). The sensor can be included in a vehicle travelling (e.g., moving along a road) through the environment. Portions (e.g., one or more of the pixels) of the image data can represent portions (e.g., one or more objects) of the environment. In some examples, the image data can include a group (e.g., a first group) of pixels associated with an object (e.g., a first object (e.g., a vehicle)) in the environment. In those examples, the image data can include another group (e.g., a second group) of pixels associated with another object (e.g., a second object (e.g., a pedestrian)) in the environment. In those examples, the image data can include another group (e.g., a third group) of pixels can associated with another object (e.g., a third object (e.g., a wheel)) in the environment.

An example 104 illustrates image data associated with an environment in which a vehicle is travelling. In some examples, the vehicle can perform the operations of the process 100, which can include capturing the sensor data (e.g., the image data) of the environment. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

The image data can include groups of pixels associated with objects. The groups can include a group of pixels 106 (e.g., a first group of pixels) representing a vehicle (e.g., the first object), a group of pixels 108 (e.g., a second group of pixels) representing a pedestrian (e.g., the second object), and a group of pixels 110 (e.g., a third group of pixels) representing a wheel (e.g., the third object) in the environment.

An operation 112 can include receiving depth data representing the environment. A sensor (e.g., a depth sensor) of the vehicle can capture the depth data. The depth data can be three-dimensional (3D) data and can include lidar data, time of flight data, and the like. The depth data can be associated with the image data at least by having partially overlapping fields of views (e.g., at least a portion of the image data and the depth data represent the same scene or portion of the environment).

In some examples, the depth data can represent any number objects in the environment. Any of one or more of the objects can be a same type, or a different type, as one or more remaining ones of the objects. Any of one or more of the objects represented in the depth data can be the same as corresponding ones of the objects represented by the image data. In a similar way, any of one or more of the objects represented in the image data can be the same as corresponding ones of the objects represented by the depth data.

An example 114 illustrates depth data representing the environment. The depth data can be 3D data associated with the image data (e.g., by virtue of corresponding to the same scene). The depth data can include representations (e.g., a representation 116 (e.g., a first representation) associated with the vehicle, a representation 118 (e.g., a second representation) associated with the pedestrian, and a representation 120 (e.g., a third representation) associated with the wheel) associated with the objects.

An operation 122 can include projecting the depth data into the image data. In some examples, the operation 122 can be based at least in part on calibration information, pose(s) of an image sensor and/or depth sensor, transformation(s) (e.g., adjusting for motion of a vehicle while capturing depth data), and the like.

The depth data can include depth values associated with corresponding pixels of the image data. In some examples, the pixels (e.g., a first pixel) can be associated with intensity values (e.g., a first intensity value), as well as with the depth values (e.g., a first depth value). As can be understood, a number of lidar points may be less than the number of pixels of image data. That is, there may be pixels of image data that are not associated with a depth value from the depth data.

Examples 124 and 126 illustrate the depth data and the image data, respectively, with an arrow representing the depth data being projected into the image data. The example 124 is similar to the example 114. The example 126 is similar to the example 104. The depth data can be projected, as projected data (also referred to herein as "associated data"), into the image data. A projection of the depth data can be performed as a transformation that includes associating the points of the depth data with the corresponding pixels of the image data. In some examples, the projection can be performed based on the transformation by associating each pixel of the image data that corresponds to a respective point of the depth data, with the respective point of the depth data.

In some examples, calibration of one or more sensors on the vehicle can be performed prior to the projection of the depth data. The sensor(s) can be calibrated based on determining one or more of the depth sensors are not aligned with one or more of the image sensors. In some examples, the vehicle can analyze the image data and the depth data, prior to projecting the depth data into the image data. The vehicle can determine a misalignment between the image sensor(s) and the depth sensor(s). The determining of the misalignment can be include determining whether the depth data that is received is aligned with the received image data that is received. The determining of the misalignment can be include determining whether a portion (e.g., an entire portion) of the depth data that is received overlaps with a portion (e.g., an entire portion) of the image data that is received. In some examples, whether the depth data is aligned with the image data can be determined based on a comparison between one or more portions (e.g., entire portion(s) or partial portion(s)) of each of one or more objects in the depth data and one or more portions (e.g., entire portion(s) or partial portion(s)) of each of one or more objects in the image data. In those examples, the portion(s) of each of the object(s) associated with the depth data that are utilized for the comparison may be the same, respectively, as the portion(s) of each of the object(s) associated with the image data.

The vehicle can calibrate or recalibrate, any number of the sensor(s) (e.g., image sensor(s) and/or depth sensor(s)), based on determining that the depth data is not aligned with the image data. The vehicle can then receive new image data, into which the depth data is projected, as the associated data, in a similar way as for the depth data being projected into the image data, as discussed above. Alternatively or additionally, the vehicle can receive new depth data that can be projected, as the associated data, into the image data or the new image data, in a similar way as for the depth data being projected into the image data, as discussed above. In some examples, the vehicle can iteratively calibrate and/or recalibrate any number of the sensor(s), any number of times, and either utilize the resulting image data and/or the resulting image depth data, or perform a recalibration, based on a misalignment associated with the resulting image data and/or the resulting depth data. The vehicle can iteratively calibrate and/or recalibrate any number of the sensor(s) until calibration of the sensor(s) and alignment of depth data and the image data is achieved.

In some examples, the performing of the transformation of the depth data can include receiving depth data. The depth data may be associated with a view that includes a 360 degree portion of the environment. The image data may be associated with a view that includes a portion of the environment that is less than the 360 degree portion. The depth data (e.g., a portion of the depth data) that is associated with the image data can be utilized, as the aligned depth data, to implement the depth data in any of the techniques as discussed throughout this disclosure, such as to determine the alignment, to calibrate and/or recalibrate the sensor(s), and/or to determine the dense depth data, etc. The depth data that is associated with the image data can be utilized as the aligned depth data, based on the depth data being determined as being aligned with the image data. In some examples, the depth data can be projected into the image data based on determining that a first field of view of the image sensor at least partially overlaps a second field of view of the lidar sensor.

In some examples, the performing of the transformation of the depth data can include aligning, as aligned depth data, a portion of the depth data with the image data. The depth data that is associated with the image data can be aligned and utilized as the aligned depth data, based on determining the depth data is not aligned with the image data (e.g., determining that a field of view (e.g., the first field of view) of the image sensor does not at least partially overlap a field of view (e.g., the second field of view) of the lidar sensor). The portion of the depth data can be aligned with the image data by modifying (e.g., performing a modification) a size, and/or an alignment, of the portion of the depth data. The size and/or the alignment can be modified based on a known (e.g., predetermined) offset between the depth sensor and the image sensor. A result of the modification can be determined as aligned depth data (e.g., a portion of aligned depth data) (also referred to herein as "depth data" or "aligned depth data," for simplicity), with the portion of the aligned depth data being aligned with a field of view of the image sensor.

The modifying of the size, and/or the alignment, of the portion of the depth data can be performed based on one or more comparisons between the depth data and the image data. In some examples, the modifying of the size, and/or alignment, of the portion of the depth data can be performed based on one or more comparisons between one or more portions (e.g., entire portion(s) or partial portion(s)) of each of one or more objects in the depth data and one or more portions (e.g., entire portion(s) or partial portion(s)) of each of one or more objects in the image data. In those examples, a result of the modification determined as the aligned depth data can include the portion(s) of each of the object(s) associated with the depth data being the same, respectively, as the portion(s) of each of the object(s) associated with the image data.

In some examples, the vehicle can iteratively align and/or realign the portion of the depth data and/or the portion of the aligned depth data. The portion of depth data and/or the portion of the aligned depth data can be aligned and/or realigned based on new depth data (e.g., a portion of new depth data) that is received and/or new image data that is received. In some examples, the portion of the aligned depth data that is associated with the image data can be utilized to implement the depth data in any of the techniques as discussed throughout this disclosure, such as to determine a realignment, to calibrate or recalibrate the sensor(s), and/or to determine the dense depth data, etc.

An operation 128 can include determining dense depth data based on a depth completion algorithm. The depth data that is projected into the image data can be utilized to determine another depth value (e.g., a second depth value) of another pixel (e.g., a second pixel) associated with another intensity value (e.g., a second intensity value). The second depth value can be determined based on the depth completion algorithm (e.g., a least squares optimization algorithm), the first intensity value, the first depth value, and the second intensity value. The second depth value can be determined based on a first subset of the image data that is associated with the depth data, and a second subset of the image data that is not associated with a measured depth value. The second subset can include the second depth value that is determined based at least in part on the depth completion algorithm.

The least squares optimization algorithm can be utilized to determine the dense depth data based on weights associated with intensity values. Depth values associated with pixels that are neighboring pixels can be determined. The neighboring pixels can be included in one of the groups of pixels. By way of example, the neighboring pixels can include a pixel (e.g., the first pixel) and another pixel (e.g., the second pixel) that is a neighboring (e.g., adjacent) pixel (e.g., the second pixel that is within a threshold pixel distance to the first pixel). A weight can be determined based on a difference between the first intensity value and the second intensity value. The second depth value can be determined based on the weight. Although the second pixel that is within a threshold pixel distance to the first pixel can be utilized to determine the weight as discussed in this disclosure, it is not limited as such. In some examples, any pixel that is within any pixel distance to the first pixel can be utilized to determine the weight in the same way as the second pixel that is within the threshold pixel distance to the first pixel.

In some examples, a third intensity value of a third pixel of the image data can be associated with a third depth value of the depth data. A weight can be determined based at least in part on the first intensity value, the second intensity value, and the third intensity value. A fourth depth value of the second pixel can be determined based at least in part on the least squares optimization algorithm, the weight, the first depth value, and the third depth value. By way of example, the neighboring pixels can include the second pixel and the third pixel that is a neighboring (e.g., adjacent) pixel (e.g., the second pixel that is within a threshold pixel distance to the third pixel).

The least squares optimization algorithm can be utilized to determine a relationship between intensity values and depth values. In some examples, a square of a difference between intensity values may be inversely related to a difference between depths values. By way of example, a square of a difference (e.g., a first difference) between the first intensity value and the second intensity value can be inversely related to a difference (e.g., a second difference) between the first depth value and the second depth value. In other words, if there is a known depth for a pixel, it is possible to look at a square of a difference between the intensities of the pixel and another pixel to determine a depth for the other pixel (e.g., the depth for the other pixel can be determined by utilizing the corresponding intensities of the pixels and the known depth of the pixel).

A bounding box (e.g., a 3D bounding box) associated with an object in the environment can be determined based on depth values (e.g., the first depth value and the second depth value). Bounding boxes associated with one of the objects in the environment can be determined based on one or more of the depth values associated with pixels in a corresponding representation. In some examples, depth values (e.g., the first depth value and the second depth value) can be associated with pixels (e.g., the first pixel and the second pixel, respectively) in a representation (e.g., the representation 116) of one of the objects (e.g., the vehicle). A bounding box associated with the vehicle can be determined based on the first depth value and the second depth value associated with pixels the first pixel and the second pixel, respectively, in the representation 116. The pixels (e.g., the first pixel and the second pixel) associated with the depth value(s) (e.g., the first depth value and the second depth value, respectively) used to determine the bounding box can be associated with corresponding points in the representation 132. In some examples, the points in the representation 132 can include a point (e.g., a first point associated with the first pixel) and another point (e.g., a second point associated with the second pixel) in the first group of points.

The depth values (e.g., the first depth value and the second depth value) can be input into a machine learned (ML) model to determine a bounding box associated with an object in the environment. The depth values (e.g., the first depth value and the second depth value) can be input into the ML model to determine a classification associated with the object in the environment.

The depth values (e.g., the first depth value and the second depth value) can be utilized to control the vehicle. The vehicle can be controlled based on the bounding boxes, which can be determined based on the depth values. In some examples, the vehicle can be controlled based on the bounding box associated with the vehicle, which is determined based on the depth values (e.g., the first depth value and the second depth value) associated with the points in the representation 132.

An example 130 illustrates dense depth data that is determined based on the depth data being projected into the image data. The dense depth data can include representations (e.g., a first representation 132 associated with the vehicle, a second representation 134 associated with the pedestrian, and a third representation 136 associated with the wheel) associated with the objects.

Although intensity values of respective pixels in image data can be utilized along with the depth completion algorithm, and one or more depth values associated with corresponding pixels, to determine one or more remaining depth values as discussed above in this disclosure, it is not limited as such. In some examples, intensity values associated with respective points of the depth data can be utilized in a similar way as for the intensity values associated with the image data. The intensity values associated with respective points of the depth data can be determined to be associated with corresponding pixels that are associated with the respective points (e.g., each intensity value associated with a point of the depth data can be determined to be associated with a pixel that is associated with the point).

In some examples, the intensity values of respective points of the depth data can be utilized along with the depth completion algorithm, and depth values associated with respective points, to determine remaining depth values. In those examples, the depth data that includes the intensity values can be a same or different type of depth data that includes the depth values utilized to determine the remaining depth values. Associated data that includes the intensity values of the respective points in the depth data can be utilized in any of the techniques discussed throughout the disclosure, in a similar way as the associated data (e.g., the projected data) that includes the intensity values of the respective pixels.

In some examples, differences between intensity values of points of the depth data (and/or of the image data, as discussed herein) can be utilized to determine dense depth data. A difference between an intensity value (e.g., a third intensity value) of a point (e.g., a first point) of the depth data associated with a pixel (e.g., a third pixel) and a another intensity value (e.g., a fourth intensity value) of another point (e.g., a second point) of the depth data associated with another pixel (e.g., a fourth pixel) can be utilized to determine a weight. The fourth pixel can be utilized along with the third pixel to determine the weight, based on the fourth pixel being within a threshold pixel distance to the third pixel. The weight can be utilized along with a depth value (e.g., a third depth value) of the depth data associated with third pixel, and the depth completion algorithm, to determine a depth value (e.g., a fourth depth value) associated with the fourth pixel. By way of example, the fourth depth value associated with the fourth pixel, which is not aligned with any point, can be determined by utilizing the depth completion algorithm, the third intensity value, the third depth value, and the fourth intensity value. The fourth depth value can be utilized to determine the dense depth data. Although the fourth pixel that is within a threshold pixel distance to the third pixel can be utilized to determine the weight as discussed in this disclosure, it is not limited as such. In some examples, any pixel that is within any pixel distance to the third pixel can be utilized to determine the weight in the same way as the fourth pixel that is within the threshold pixel distance to the third pixel Although the least squares optimization algorithm can be utilized to determine a relationship between intensity values and depth values as discussed above in this disclosure, it is not limited as such. In some examples, one or more depth completion algorithms of any types can be utilized, individually or in combination, to determine a relationship between the intensity values and the depth values in a similar way as for the least squares optimization algorithm.

Although the image sensor can capture the image data and the depth sensor can capture the depth data as discussed above in this disclosure, it is not limited as such. In some examples, one or more image sensors can be implemented in a similar way as for the image sensor discussed above to capture one or more portions of image data, respectively;

and, one or more depth sensors can be implemented in a similar way as for the depth sensor discussed above to capture one or more portions of depth data, respectively. The portion(s) of image data can be utilized to implement the image data in any of the techniques discussed throughout this disclosure. The portion(s) of depth data can be utilized to implement the depth data in any of the techniques discussed throughout this disclosure.

Although various techniques discussed throughout this disclosure include the depth data being projected into the image data, the term "projected" is utilized for convenience and clarity of explanation. In some examples, the projecting of the depth data according to any of the techniques as discussed throughout this disclosure can be interpreted as being implemented as a projection of the depth data into the image data (e.g., a transformation of the depth data) without the use of any ML model.

Although dense depth data can be determined based on a depth completion algorithm as discussed above in this disclosure, it is not limited as such. In some examples, the ML model can be utilized, alternatively or additionally, to the depth completion algorithm to determine the dense depth data based on the associated data.

Therefore, and as described herein, a depth completion algorithm can be used to determine depth data for pixels not associated with captured depth data. Dense depth data can be determined based on the depth completion algorithm and utilized to increase the accuracy by which information for the objects is determined. The more accurate information associated with the objects can improve detection, segmentation, and/or classification of the objects.

Figure 2A:
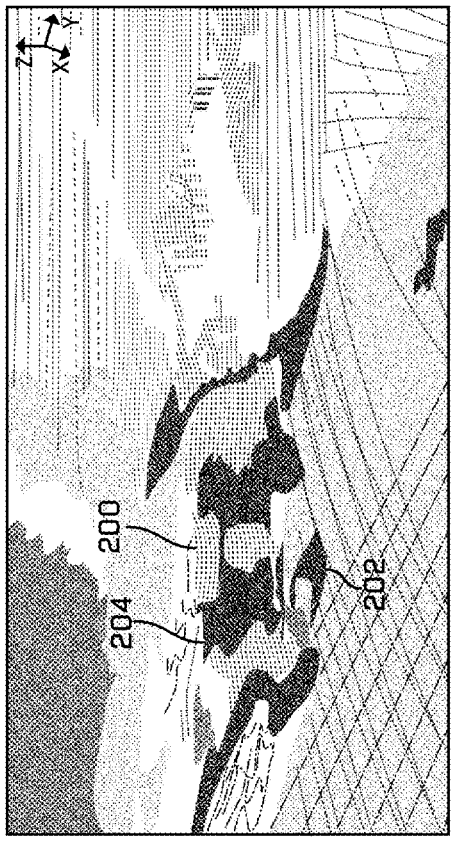
FIGS. 2A-2C illustrate various types of sensor data representing an environment.
Figure 2B:
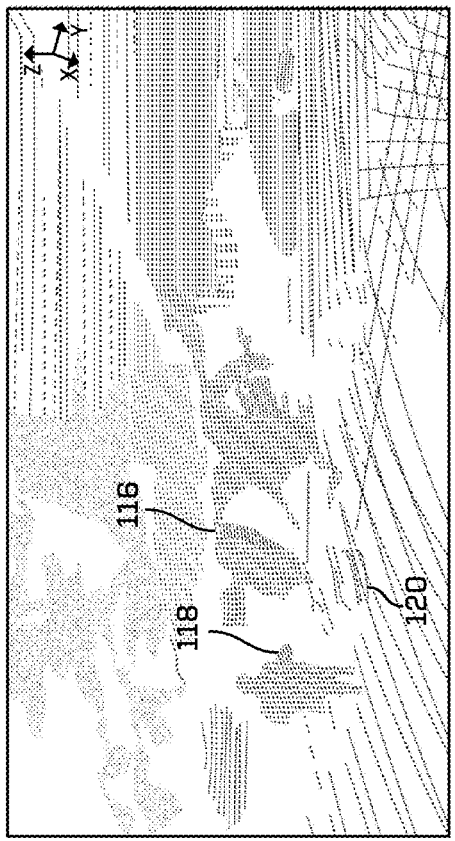
Figure 2C:
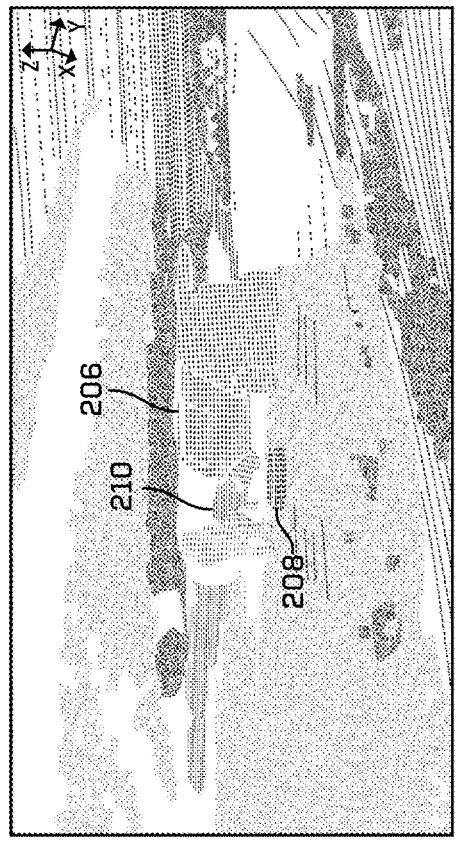

Furthermore, by utilizing the depth completion algorithm to determine the dense depth data, computation resources can be conserved. The computation resources can be conserved based on fewer processing resources being required to determine data (e.g., the dense depth data) utilized to control the vehicle according to the techniques discussed herein, in comparison to conventional techniques for determining data utilized to control the vehicle. The dense depth data can include depth data for areas between points of the original depth data. The depth completion algorithm can be utilized to determine the dense depth data based on there being fewer points of the original depth data than pixels of the original image data. Depth values for areas that do not include points that are aligned with pixels can be determined based on the depth completion algorithm. The dense depth data can provide more a thorough and complete rendition of a scene of the environment. The dense depth data can be utilized to provide data that is useful for determining objects in a scene that were otherwise difficult to detect using other techniques, because the dense depth data gives a richer representation of the scene that is easily digestible by the ML model. FIGS. 2A-2C. illustrate various types of sensor data representing an environment.

As illustrated in FIG. 2A, three-dimensional (3D) data can be utilized to represent the environment. The 3D data can include depth data. The depth data can be captured by a lidar sensor, a time of flight sensor, and the like. The depth data can include representations associated with the objects (e.g., a first representation 116 associated with the vehicle, a second representation 118 associated with the pedestrian, and a third representation 120 associated with the wheel).

As illustrated in FIG. 2B, image data can be input to a machine learned (ML) model and the ML model can output depth data associated with individual pixels. An example of a technique for utilizing an ML model to determine depth data can be found, for example, in U.S. patent application Ser. No. 16/684,554, filed Nov. 14, 2019, and titled "Depth Data Model Training." U.S. patent application Ser. No. 16/684,554 is incorporated by reference herein, in its entirety for all purposes. The image-based depth data can be associated with the lidar data. However, the image-based depth data and the lidar-based depth data may not be accurately aligned, which can lead to problems downstream while determining objects, controlling a vehicle, and the like.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

As illustrated in FIG. 2C, three-dimensional (3D) data representing the environment can be processed utilizing a depth completion algorithm. In some examples, the depth data, discussed above with reference to FIG. 2A, can be processed utilizing the depth completion algorithm (e.g., a least squares optimization algorithm). The depth data can be processed utilizing the depth completion algorithm and output as dense depth data. The depth completion algorithm processed depth data can include representations (e.g., a first representation 206 associated with the vehicle, a second representation 208 associated with the pedestrian, and a third representation 210 associated with the wheel) associated with the objects in the environment. In some examples, because the captured depth data (e.g., lidar data) can be directly associated with image data and can be input to the depth completion algorithm, the generated point cloud of dense depth data can be aligned with the depth data with little or no misalignment errors. As such, subsequent processing can be performed accurately without registration error.

In addition to the depth completion discussed above, in some examples, the image data can be input into a trained machine learned (ML) model, which can output instance segmentation data, including instances associated with objects in the environment. An example of a technique for utilizing an ML model to determine instance segmentation data from image data can be found, for example, in U.S. patent application Ser. No. 16/013,729, filed Jun. 20, 2018, and titled "Improvements for Machine Learning Techniques." U.S. patent application Ser. No. 16/013,729 is incorporated by reference herein, in its entirety for all purposes. The instances can include an instance associated with a representation of the object in the image data. The instance segmentation can be associated with the corresponding image data and dense depth data. A depth distribution can be determined based on the instance. A first depth metric associated with the instance can be determined for a first mode of the depth distribution. A second depth metric associated with the instance can be determined, for a second mode of the depth distribution. The second depth metric can be updated based on the first depth metric. By updating the second depth metric, a more accurate representation of the object with which the instance is associated can be determined. Depth data of one or more pixels associated with the second depth metric can be updated.

In some examples, the first and second depth metrics can correspond to an average value for a mode, a median value for a mode, a centroid of a point cloud of an object, a closest depth of the instance, and the like.

Therefore, and as described herein, the depth completion algorithm can be utilized to process sparse dense data (e.g., the depth data, discussed above with reference to FIG. 2A) and determine dense depth data (e.g., the depth completion algorithm processed depth data). The dense depth data can be utilized to increase the accuracy by which information for the objects is determined. The more accurate information associated with the objects can improve detection, segmentation, and/or classification of the objects.

The depth completion algorithm can be utilized to determine the dense depth data with accurate representations of objects notwithstanding the amount of depth data that is processed by the depth completion algorithm being sparse. The representations determined by utilizing other techniques may be skewed, misshaped, or unclear in comparison to the representations determined utilizing the depth completion algorithm. The representations determined utilizing the depth completion algorithm can be determined more accurately than with other techniques. The representations determined utilizing the depth completion algorithm can be clearer, have more definition, and be more easily identifiable.

Figure 3:
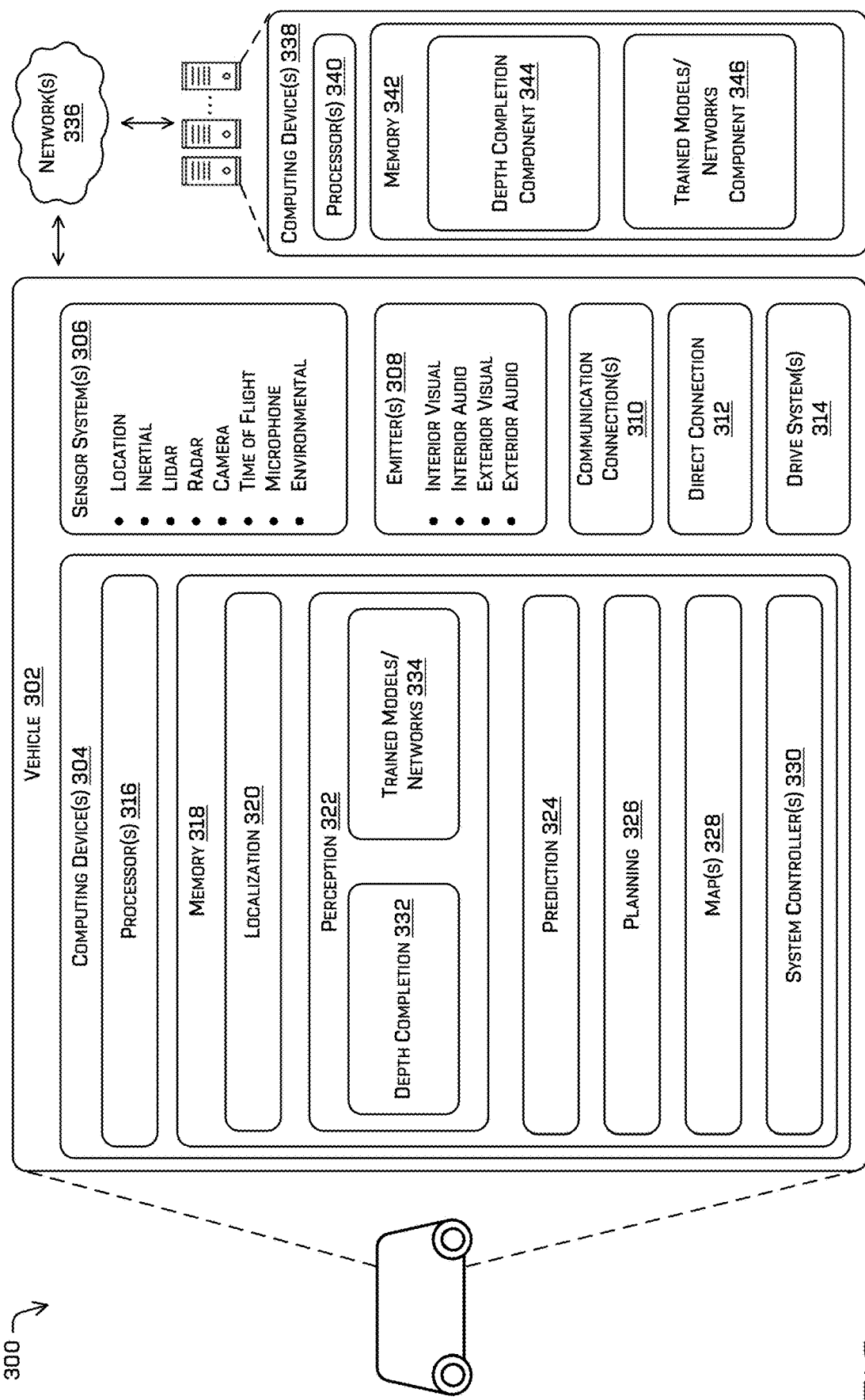
FIG. 3 depicts a block diagram of an example system for implementing the techniques described herein.

FIG. 3 depicts a block diagram of an example system 300 for implementing the techniques described herein. In at least one example, the system 300 can include a vehicle 302, which can be the same vehicle as vehicles described above with reference to FIGS. 1 and 2. Vehicle 302 can include one or more vehicle computing devices 304, one or more sensor systems 306, one or more emitters 308, one or more communication connections 310, at least one direct connection 312, and one or more drive systems 314. In at least one example, sensor system(s) 306 can generate the sensor data described above with reference to FIGS. 1 and 2.

Vehicle computing device(s) 304 can include processor(s) 316 and memory 318 communicatively coupled with processor(s) 316. In the illustrated example, vehicle 302 is an autonomous vehicle. However, vehicle 302 could be any other type of vehicle. In the illustrated example, memory 318 of vehicle computing device(s) 304 stores a localization system 320, a perception system 322, a prediction system 324, a planner system 326, a map storage 328, and one or more system controllers 330. Although these systems and components are illustrated, and described below, as separate components for ease of understanding, functionality of the various systems and controllers may be attributed differently than discussed. By way of non-limiting example, functionality attributed to perception system 322 may be carried out by localization system 320 and/or prediction system 324. Moreover, fewer or more systems and components may be utilized to perform the various functionalities described herein. Furthermore, though depicted in FIG. 3 as residing in memory 318 for illustrative purposes, it is contemplated that localization system 320, perception system 322, prediction system 324, planner system 326, and/or one or more system controllers 330 can additionally, or alternatively, be accessible to vehicle 302 (e.g., stored on, or otherwise accessible by, memory remote from vehicle 302).

Map storage 328 may store one or more maps. A map can be any number of data structures modeled in two dimensions or three dimensions that can provide information about an environment, such as, but not limited to, topologies (such as intersections), streets, mountain ranges, roads, terrain, and the environment in general.

As also illustrated in FIG. 3, perception system 322 can include a depth completion system 332 and a trained models/networks system 334. Depth completion system 332 may store depth completion information. Trained models/networks system 334 may process any of the data (e.g., projected data, depth data (e.g., sparse dense data, dense depth data), etc.) that is processed as described above with reference to FIGS. 1 and 2.

In at least one example, localization system 320 can include functionality to receive data from sensor system(s) 306 to determine a position and/or orientation of vehicle 302 (e.g., one or more of an x-, y-, z-position, roll, pitch, or yaw). For example, localization system 320 can include and/or request/receive a map of an environment (e.g., from map storage 328) and can continuously determine a location and/or orientation of the autonomous vehicle within the map. In some instances, localization system 320 can utilize SLAM (simultaneous localization and mapping), CLAMS (calibration, localization and mapping, simultaneously), relative SLAM, bundle adjustment, non-linear least squares optimization, differential dynamic programming, or the like to receive image data, lidar data, radar data, IMU data, GPS data, wheel encoder data, and the like to accurately determine a location of the autonomous vehicle. In some instances, localization system 320 can provide data to various components of vehicle 302 to determine an initial position of an autonomous vehicle for generating a trajectory for travelling in the environment.

In some instances, perception system 322 can include functionality to perform object detection, segmentation, and/or classification. In some examples, perception system 322 can provide processed sensor data that indicates a presence of an object that is proximate to vehicle 302, such as objects represented by groups of pixels 106, 108, and 110. The perception system may also include a classification of the entity as an entity type (e.g., car, pedestrian, cyclist, animal, building, tree, road surface, curb, sidewalk, unknown, etc.). For instance, perception system 322 may utilize data determined by depth completion system 332 and/or trained models/networks system 334 to determine the classification. In additional and/or alternative examples, perception system 322 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a bounding box associated with the object, etc. Characteristics associated with the environment can include, but are not limited to, a presence of another object in the environment, a state of another object in the environment, a time of day, a day of a week, a season, a weather condition, an indication of darkness/light, etc.

Prediction system 324 can access sensor data from sensor system(s) 306, map data from map storage 328, and, in some examples, perception data output from perception system 322 (e.g., processed sensor data). In at least one example, prediction system 324 can determine features associated with the object based on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, prediction system 324 may be configured to determine a distance between an object and a proximate driving lane, a width of a current driving lane, proximity to a crosswalk, semantic feature(s), interactive feature(s), etc.

Prediction system 324 can analyze features of objects to predict future actions of the objects. For instance, prediction system 324 can predict lane changes, decelerations, accelerations, turns, changes of direction, or the like.

In some examples, prediction system 324 can include functionality to determine predicted point(s) representing predicted location(s) of an object in the environment. Prediction system 324, in some implementations, can determine a predicted point associated with a heat map based on a cell associated with a highest probability and/or based on cost(s) associated with generating a predicted trajectory associated with the predicted point.

For example, prediction system 324 can select a point, cell, or region of a heat map as a predicted point based on evaluating one or more cost functions associated with risk factors, safety, and vehicle dynamics, just to name a few examples. Such costs may include, but are not limited to, a positional-based cost (e.g., limiting the distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the object may follow rules of the road, and the like. In at least some examples, the probability associated with the cell may be multiplied with the cost (which, in at least some examples, may be normalized) such that the point (e.g., a candidate point) associated with the highest value of the cost times probability is selected as the predicted point associated with an object at a particular time.

In general, planner system 326 can determine a path for vehicle 302 to follow to traverse through an environment. For example, planner system 326 can determine various routes and trajectories and various levels of detail. For example, planner system 326 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planner system 326 can generate an instruction for guiding the autonomous vehicle along at least a portion of the route from the first location to the second location. In at least one example, planner system 326 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 302 to navigate. Thus, in example implementations described herein, planner system 326 may generate trajectories along which the vehicle can navigate, with the trajectories being contained within the drivable area.

Depth completion system 332 is configured to densify sensor data based on depth data and intensity data utilized to determine other depth data. The sensor data can be densified based on depth values and intensity values associated with pixels in image data. The depth values and the intensity values can be utilized, along with a depth completion algorithm, to determine other depth values associated with other pixels. The other depth values associated with other pixels can be utilized to densify the sensor data. The densified sensor can be utilized to determine three-dimensional (3D) bounding boxes associated with objects in an environment through which the vehicle 302 is travelling.

The depth completion algorithm can be a least squares optimization algorithm. The least squares optimization algorithm can be utilized to determine depth data (e.g. a depth "U(s)," which represents a depth "U" of a pixel "s."), based at least in part on equation (1), as follows:

$$J(U)=\Sigma_r(U(r)-\Sigma_{s\in N}(r)w_{rs}U(s))^2 \qquad (1).$$

In equation (1), "r" represents a pixel (x,y); "s" represents a neighboring pixel of pixel "r", "$w_{rs}$" represents a weight between pixels "r" and "s," and "U(r)" represents a depth "U" of the pixel "r." If two neighboring pixels have similar intensities, then we can assume that they are more likely to have similar depths. Two neighboring pixels that have dissimilar intensities can be assumed be less likely to have similar depths. A weight (e.g., a difference between the depth "U(r)" and the depth "U(s)") can be represented as "$w_{rs}$" in equation (2), as follows:

$$w_{rs} \propto \exp\left(\frac{-(Y(r)-Y(s))^2}{2\sigma_r^2}\right) \qquad (2)$$

In equation (2), "Y(r)" represents an intensity value of the pixel "r," and "Y(s)" represents an intensity value of the pixel "s." The other depth values associated with other pixels, as discussed above, can be determined in a similar way as for the depth "U(s)." While one or more of the functionalities of depth completion system 332 may be carried out by perception system 422, depth completion system 332 may be separate from perception system 422.

Trained models/networks system 334 is configured to process sensor data (e.g., image data). In some examples, the trained models/networks system 334 can perform any processing of the ML model, as discussed above with reference to FIGS. 1 and 2.

In at least one example, localization system 320, perception system 322, prediction system 324, and/or planner system 326 can process sensor data, as described above, and can send their respective outputs over network(s) 336, to computing device(s) 338. In at least one example, localization system 320, perception system 322, prediction system 324, and/or planner system 326 can send their respective outputs to computing device(s) 338 at a particular frequency, after a lapse of a predetermined period of time, in near real-time, etc.

In at least one example, vehicle computing device(s) 304 can include one or more system controllers 330, which can be configured to control steering, propulsion, braking, safety, emitters, communication, and other systems of vehicle 302. These system controller(s) 330 can communicate with and/or control corresponding systems of drive system(s) 314 and/or other components of vehicle 302. For example, system controllers 330 may cause the vehicle to traverse along a drive path determined by perception system 322, e.g., a path determined based on the dense depth data determined by depth completion system 332 and/or trained models/networks system 334.

In at least one example, sensor system(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. sensor system(s) 306 can include multiple instances of each of these or other types of sensors. For instance, the lidar sensors can include individual lidar sensors located at the corners, front, back, sides, and/or top of vehicle 302. As another example, the camera sensors can include multiple cameras disposed at various locations about the exterior and/or interior of vehicle 302. sensor system(s) 306 can provide input to vehicle computing device(s) 304. Additionally and/or alternatively, sensor system(s) 306 can send sensor data, via network(s) 336, to computing device(s) 338 at a particular frequency, after a lapse of a predetermined period of time, in near real-time, etc.

Vehicle 302 can also include one or more emitters 308 for emitting light and/or sound. Emitter(s) 308 in this example include interior audio and visual emitters to communicate with passengers of vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. Emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, emitter(s) 308 can be disposed at various locations about the exterior and/or interior of vehicle 302.

Vehicle 302 can also include communication connection(s) 310 that enable communication between vehicle 302 and other local or remote computing device(s). For instance, communication connection(s) 310 can facilitate communication with other local computing device(s) on vehicle 302 and/or drive system(s) 314. Also, communication connection(s) 310 can allow the vehicle to communicate with other nearby computing device(s) (e.g., other nearby vehicles, traffic signals, etc.). Communications connection(s) 310 also enable vehicle 302 to communicate with a remote tele-operations computing device or other remote services.

Communications connection(s) 310 can include physical and/or logical interfaces for connecting vehicle computing device(s) 304 to another computing device or a network, such as network(s) 336. For example, communications connection(s) 310 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, vehicle 302 can include drive system(s) 314. In some examples, vehicle 302 can have a single drive system 314. In at least one example, if vehicle 302 has multiple drive systems 314, individual drive systems 314 can be positioned on opposite ends of vehicle 302 (e.g., the front and the rear, etc.). In at least one example, drive system(s) 314 can include sensor system(s) to detect conditions of drive system(s) 314 and/or surroundings of vehicle 302. By way of example and not limitation, sensor system(s) 306 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s) can be unique to drive system(s) 314. In some cases, the sensor system(s) 306 on drive system(s) 314 can overlap or supplement corresponding systems of vehicle 302 (e.g., sensor system(s) 306).

Drive system(s) 314 can include many of the vehicle systems, including a high voltage battery, a motor to propel vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, drive system(s) 314 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of drive system(s) 314. Furthermore, drive system(s) 314 also include communication connection(s) that enable communication by the respective drive module with other local or remote computing device(s).

As described above, vehicle 302 can send sensor data to computing device(s) 338 via network(s) 336. In some examples, vehicle 302 can send raw sensor data to computing device(s) 338. In other examples, vehicle 302 can send processed sensor data and/or representations of sensor data to computing device(s) 338 (e.g., data output from localization system 320, perception system 322, prediction system 324, and/or planner system 326). In some examples, vehicle 302 can send sensor data to computing device(s) 338 at a particular frequency after a lapse of a predetermined period of time, in near real-time, etc.

Computing device(s) 338 can receive sensor data (raw or processed) from vehicle 302 and/or one or more other vehicles and/or data collection devices and can determine a drivable area based on the sensor data and other information. In at least one example, computing device(s) 338 can include processor(s) 340 and memory 342 communicatively coupled with processor(s) 340. In the illustrated example, memory 342 of computing device(s) 338 stores depth completion component 344 and a trained models/networks component 346, for example.

In at least one example, depth completion component 344 can correspond to, and/or be implemented in a similar way as, depth completion component 332. Moreover, depth completion component 344 can perform one or more operations as described above and ascribed to depth completion component 332. In at least one example, trained models/networks component 346 can correspond to, and/or be implemented in a similar way as, trained models/networks component 334. Moreover, trained models/networks component 346 can perform one or more operations as described above and ascribed to trained models/networks component 334. In some examples, the data (e.g., the projected data, the depth data (e.g., the dense depth data), etc.) may be determined at computing device(s) 338 and transferred back to vehicle 302, e.g., via networks 336.

Processor(s) 316 of vehicle 302 and processor(s) 340 of computing device(s) 338 can be any suitable processor capable of executing instructions to process data and perform operations as described herein. By way of example and not limitation, processor(s) 316 and 340 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 342 are examples of non-transitory computer-readable media. Memory 318 and 342 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of vehicle 302 can be associated with computing device(s) 338 and/or components of computing device(s) 338 can be associated with vehicle 302. That is, vehicle 302 can perform one or more of the functions associated with computing device(s) 338, and vice versa. Moreover, although various systems and components are illustrated as being discrete systems, the illustrations are examples only, and more or fewer discrete systems may perform the various functions described herein.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Figure 4:
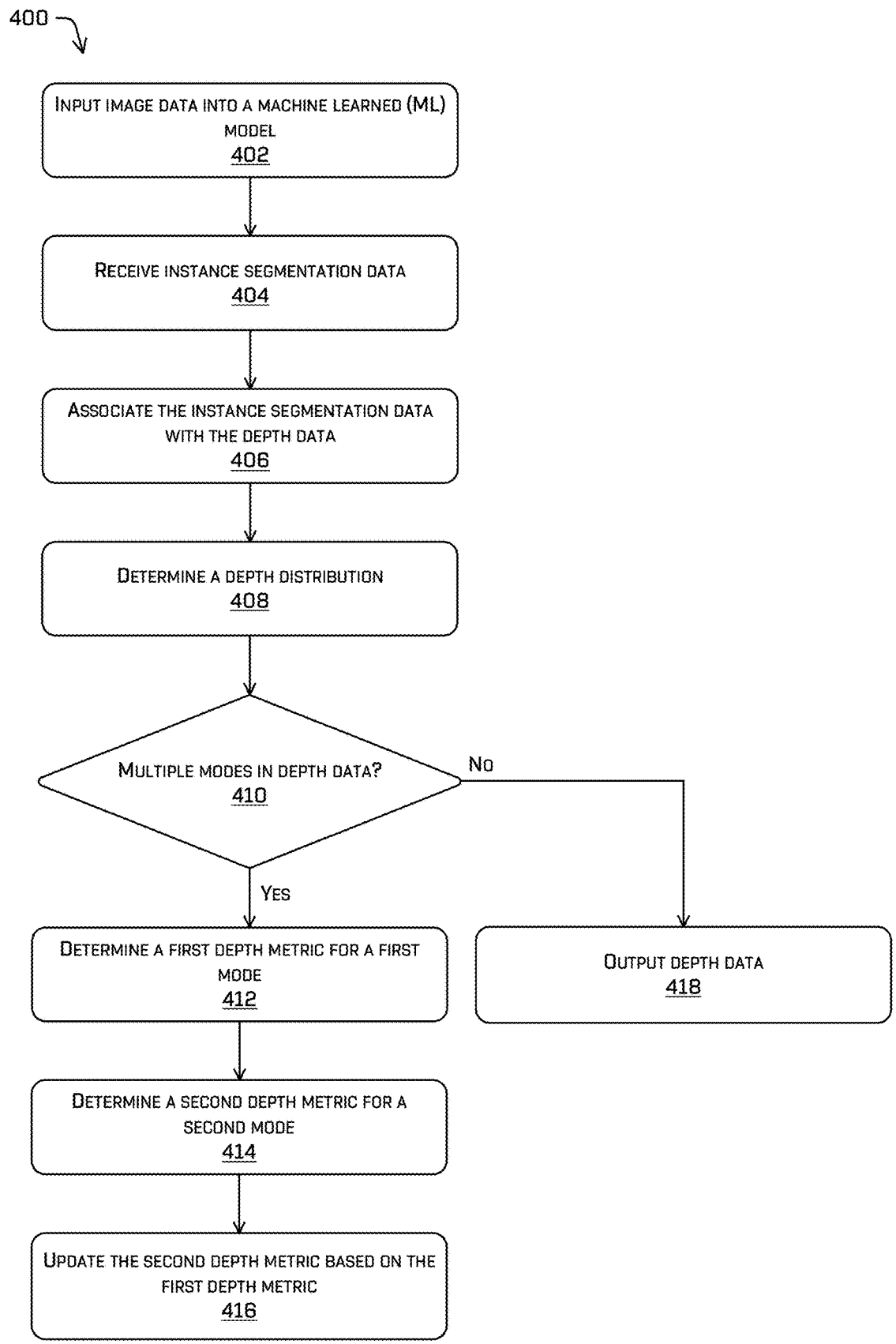
FIG. 4 depicts an example process for utilizing a depth completion algorithm and instance segmentation to update sensor data.

FIG. 4 depicts an example process 400 for utilizing a depth completion algorithm and instance segmentation to update sensor data.

At operation 402, the process can include inputting image data into a trained machine learned (ML) model. The image data input into the ML model can include two-dimensional (2D) image data. The image data can be associated with the environment through which a vehicle is travelling. The ML model can be utilized for object detection and object information determination associated with the environment. The image data can be associated with objects including, but not limited to other vehicles, cyclists, pedestrians, buildings, sidewalks, road surfaces, signage, barriers, etc.

At operation 404, the process can include receiving, from the ML model, instance segmentation data. The ML model can determine the instance segmentation data based on the image data. The ML model can be utilized to provide object detection functionalities (e.g., instance segmentation) for the vehicle. The instance segmentation can be utilized to identify static and/or dynamic objects. The instance segmentation data can include an instance associated with an object in the environment.

At operation 406, the process can include associating the instance segmentation data with the depth data. The instance in the instance segmentation data can be associated with a representation of the object in the image data. The representation can be a group of pixels in the image data.

At operation 408, the process can include determining a depth distribution. The depth distribution can be determined for the instance of the instance segmentation data. The depth distribution can include depth values associated with pixels of the image data. For example, the pixels can include a pixel (e.g., a first pixel) associated with a portion (e.g., an object, such as a vehicle) of the environment, and another pixel (e.g., a second pixel) associated with the portion (e.g., the vehicle) of the environment. The depth values can include a depth value (e.g., a first depth value) associated with the first pixel.

At operation 410, the process can include determining whether there are multiple modes in the depth data. The process can continue to operations 412, 414, and 416, based on there being multiple modes in the depth data. The process can continue to operation 418, based on there not being multiple modes in the depth data.

At operation 412, the process can include determining a first depth metric for a first mode. The first mode can be associated with the depth distribution. The first depth metric for the first mode of the depth distribution can be associated with the instance. The first depth metric can include a depth value (e.g., the first depth value), an average depth value, a peak depth value, etc.

The first depth value can be determined, utilizing the depth completion algorithm, as a ground truth depth value. The first depth value can be included in a group of depth values. Each depth value of the group of depth values can be associated with a corresponding intensity value of a group of intensity values. The first depth value can be determined as the ground truth depth value based on each intensity value of the group of intensity values matching the first intensity value. In some examples, each intensity value of the group of intensity values can be determined to match the first intensity value based on each intensity value of the group of intensity values differing from the first intensity value by less than a threshold intensity difference. The ground truth depth value can be utilized, along with the depth completion algorithm, to determine the second depth value.

At operation 414, the process can include determining a second depth metric for a second mode. The second mode can be associated with the depth distribution. The second depth metric for the second mode of the depth distribution can be associated with the instance. The second depth metric can include a depth value (e.g., a depth value, such as the ground truth depth value, associated with a pixel in the image data), an average depth value, a peak depth value, etc.).

At operation 416, the process can include updating the second depth metric based on the first depth metric. In some examples, the second depth metric can be updated based on determining to utilize a type of the first depth metric to update the second depth metric that is the same as a type of the second depth metric. The first depth metric can be a type of metric (e.g., a first type of metric (e.g., a first average depth value). The second depth metric can be a type of metric (e.g., a second type of metric (e.g., a second average depth value). By way of example, the second depth metric being the second average depth value can be updated to be the first average depth value.

In other examples, the second depth metric can be updated based on determining to utilize a type of the first depth metric to update the second depth metric that is different than a type of the second depth metric. The first depth metric can be a type of metric type (e.g., a third type of metric (e.g., a third average depth value). The second depth metric can be a type of metric (e.g., a fourth type of metric (e.g., a peak depth value). By way of example, the second depth metric being the peak depth value can be updated to be the third average depth value.

At operation 418, the process can include outputting depth data. The output depth data can be utilized to control the vehicle.

Therefore, and as described herein, the dense depth data can be utilized to increase the accuracy by which information for the objects is determined. The representations determined utilizing the depth completion algorithm can be clearer and more easily identifiable than representations determined by utilizing other techniques.

Figure 5:
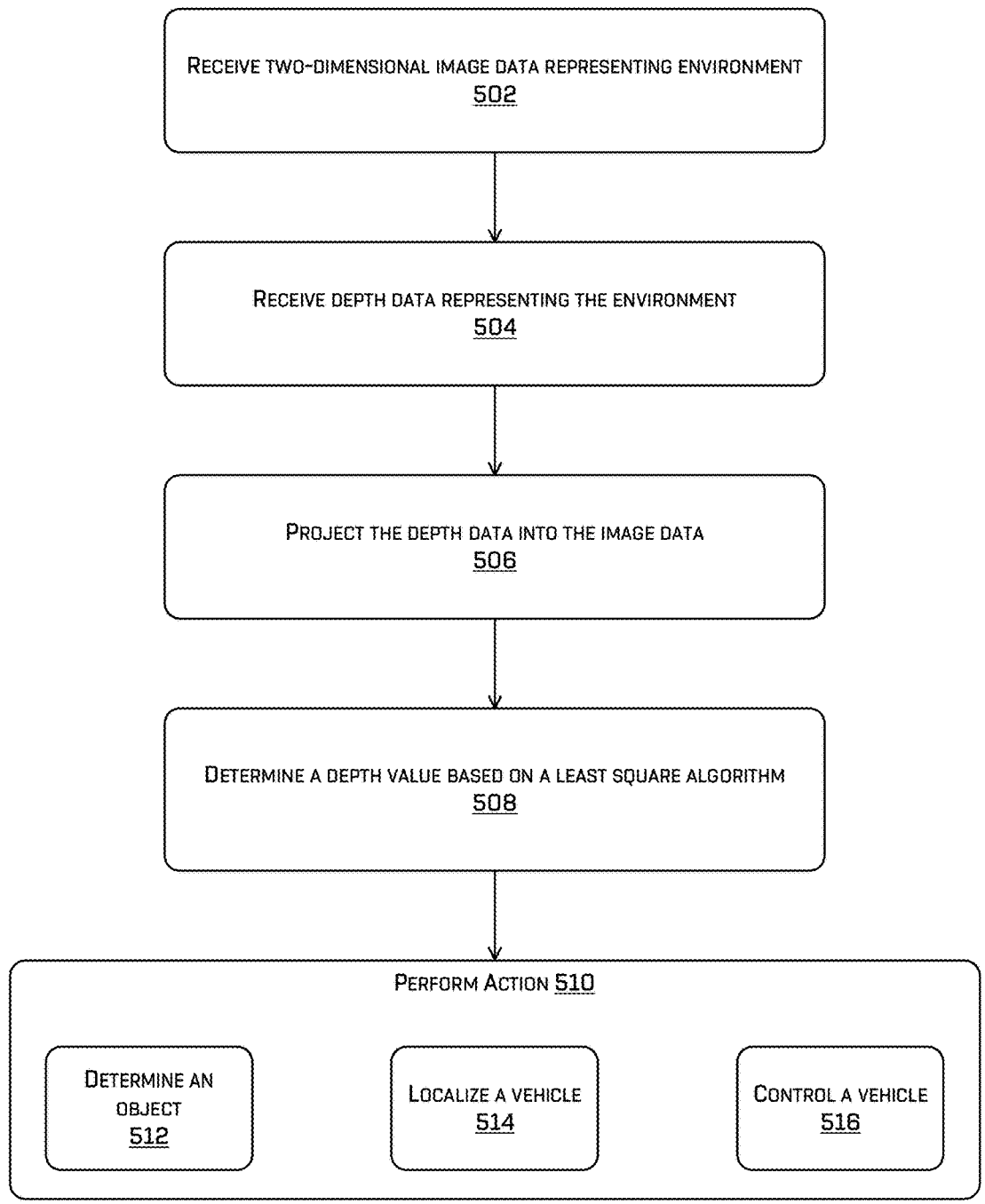
FIG. 5 depicts an example process for utilizing a depth completion algorithm to process sensor data.

FIG. 5 depicts an example process 500 for using a depth completion algorithm and instance segmentation to process sensor data. For example, some or all of the process 500 can be performed by the system 300, as described herein At operation 502, the process can include receiving two-dimensional (2D) image data representing an environment. The 2D image data can be captured by a camera of a vehicle and used to identify objects in the environment and determine information about the objects. The 2D image data can include pixels that are associated with the objects in the environment.

At operation 504, the process can include receiving depth data representing the environment. The depth data can include lidar data received from a lidar sensor, time of flight data received from a time of flight sensor, and the like. A three-dimensional (3D) representation (e.g., a point cloud and/or a 3D grid) of the environment can be generated based on 2D image data. The 3D representation can be determined as a portion (e.g., an entire portion or a partial portion) of the depth data.

At operation 506, the process can include projecting the depth data into the image data. The depth data being projected into the image data can be associated with intensity values and depth values. Each (e.g., a first intensity value) of the intensity values can be associated with a corresponding pixel (e.g., a first pixel) of the pixels. Each (e.g., a first depth value) of the depth values can be associated with a corresponding pixel (e.g., the first pixel) of the pixels.

In some examples, the operation 506 can include determining that a first field of view of the image sensor at least partially overlaps a second field of view of the lidar sensor. The depth data can be projected into the image data based on the determining that the first field of view of the image sensor at least partially overlaps the second field of view of the lidar sensor. In some examples, the depth data can be projected into the image data by aligning, as aligned depth data, the depth data (e.g., at least a portion of the depth data) with the image data (e.g., at least a portion of the image data). The depth data can be aligned with the image data based on determining that a field of view (e.g., the first field of view) of the image sensor does not at least partially overlap a field of view (e.g., the second field of view) of the lidar sensor. The aligned depth data can be utilized to implement the depth data that is projected into the image data, as discussed above.

At operation 508, the process can include determining another depth value (e.g., the second depth value) of another pixel (e.g., a second pixel) based on a depth completion algorithm (e.g., a least squares optimization algorithm). The second pixel (e.g., a neighboring pixel) can be within a threshold pixel distance to the first pixel. The second depth value can be determined based on the first intensity value, the first depth value, and a second intensity value of the second pixel. The second depth value can be determined based on a weight associated with the first intensity value and the second intensity value. The weight can be a difference between on the first intensity value and the second intensity value.

In some examples, intensity values (e.g., the first intensity value and the second intensity value) can be input into a trained machine learned (ML) model, which can output instance segmentation data, including instances associated with objects in the environment. The instances can include an instance associated with a representation of the object in the image data. The instance segmentation can be associated with the corresponding image data and dense depth data. The weight associated with the first intensity value and the second intensity value can be determined based on the instance.

At operation 510, the process can include performing an action. The performing of the action can include one or more of operations 512, 514, and 516.

At operation 512, the process can include determining an object (e.g., one of the objects in the environment). The object can be determined based on the image data and the depth data, and further based on the first intensity value, the second intensity value, the first depth value, and the second depth value.

At operation 514, the process can include localizing a vehicle (e.g., the vehicle that includes the camera, the lidar sensor, and/or the time of flight sensor). The vehicle can be localized based on the image data and the depth data, and further based on the first intensity value, the second intensity value, the first depth value, and the second depth value.

At operation 516, the process can include controlling a vehicle (e.g., the vehicle that includes the camera, the lidar sensor, and/or the time of flight sensor). The vehicle can be controlled based on the image data and the depth data, and further based on the first intensity value, the second intensity value, the first depth value, and the second depth value.

Therefore, and as described herein, the depth completion algorithm, intensity values (e.g., the first intensity value and the second intensity value), and depth values (e.g., the first depth value) can be utilized to densify depth data. Sparse depth data that is received can be densified and determined as dense depth data, based on processing of the sparse depth data utilizing the depth completion algorithm. The other dense values can be determined to determine clear object information associated with the environment. A vehicle travelling through the environment can utilize the object information to more easily and accurately avoid collisions with objects.

EXAMPLE CLAUSES

A: A system comprising: one or more processors; and one or more computer-readable media storing instructions executable by the one or more processors, wherein the instructions, when executed, cause the system to perform operations comprising: receiving, from an image sensor associated with a vehicle, two-dimensional image data representing an environment, the two-dimensional image data including a first pixel and a second pixel; receiving, from a lidar sensor associated with the vehicle, depth data representing the environment; determining that a first field of view of the image sensor at least partially overlaps a second field of view of the lidar sensor; projecting the depth data into the two-dimensional image data, wherein a first intensity value of a first pixel of the two-dimensional image data is associated with a first depth value of the depth data; determining a second depth value of the second pixel based at least in part on a least squares optimization algorithm, the first intensity value, the first depth value, and a second intensity value of a second pixel of the two-dimensional image data; and controlling the vehicle, based at least in part on the first depth value and the second depth value being utilized to determine one or more objects in the environment.

B: The system of paragraph A, wherein determining the second depth value further comprises: determining that the first pixel is within a threshold pixel distance to the second pixel; determining, based at least in part on a difference between the first intensity value and the second intensity value, a weight; and determining the second depth value based at least in part on the weight.

C: The system of paragraph A or B, the instructions, when executed, cause the system to perform further operations comprising: inputting the two-dimensional image data into a machine learned (ML) model; receiving, from the ML model, instance segmentation data; associating the instance segmentation data with the depth data; for an instance of the instance segmentation data, determining a depth distribution; determining, for a first mode of the depth distribution, a first depth metric associated with the instance; determining, for a second mode of the depth distribution, a second depth metric associated with the instance; and updating the second depth metric based at least in part on the first depth metric.

D: The system of any of paragraphs A-C, wherein a third intensity value of a third pixel of the two-dimensional image data is associated with a third depth value of the depth data, the instructions, when executed, cause the system to perform further operations comprising: determining based at least in part on the first intensity value, the second intensity value, and the third intensity value, a weight; and determining a fourth depth value of the second pixel based at least in part on the least squares optimization algorithm, the weight, the first depth value, and the fourth depth value.

E: The system of any of paragraphs A-D, the instructions, when executed, cause the system to perform further operations comprising: determining a three-dimensional bounding box associated with an object in the environment based on the first depth value and the second depth value.

F: A method comprising: receiving image data representing an environment, the image data including a first pixel and a second pixel; receiving depth data representing the environment; projecting, as associated data, the depth data into the image data, the associated data including a first intensity value of the first pixel, a first depth value of the first pixel, and a second intensity value of the second pixel; determining a second depth value of the second pixel based at least in part on the associated data and a depth completion algorithm; and controlling a vehicle based on the second depth value.

G: The method of paragraph F, further comprising: determining the second depth value based at least in part on the second intensity value, and a relationship between the first intensity value the second intensity value.

H: The method of paragraph F or G, wherein the depth completion algorithm is a least squares optimization algorithm.

I: The method of any of paragraphs F-H, wherein determining the second depth value further comprises: determining that the first pixel is within a threshold pixel distance to the second pixel; determining, based at least in part on a difference between the first intensity value and the second intensity value, a weight; and determining the second depth value based at least in part on the weight and a least squares optimization algorithm.

J: The method of any of paragraphs F-I, further comprising. inputting the image data into a machine learned (ML) model; receiving, from the ML model, instance segmentation data; associating the instance segmentation data with the depth data; for an instance of the instance segmentation data, determining a depth distribution; determining, for a first mode of the depth distribution, a first depth metric associated with the instance; determining, for a second mode of the depth distribution, a second depth metric associated with the instance; and updating the second depth metric based at least in part on the first depth metric.

K: The method of any of paragraphs F-J, wherein the image data is received from an image sensor, and the depth data is received from a lidar sensor, and the depth data is projected into the image data based at least in part on determining that a first field of view of the image sensor at least partially overlaps a second field of view of the lidar sensor.

L: The method of any of paragraphs F-K, further comprising: determining a third intensity value of a point of the depth data, the third intensity value being associated with a third pixel that corresponds to the point; and determining the second depth value of the second pixel further based at least in part on the third intensity value.

M: The method of any of paragraphs F-L, wherein projecting the depth data into the image data further comprises projecting, based at least in part on a transformation, the depth data into the image data.

N: The method of any of paragraphs F-M, wherein a first subset of the image data is associated with the depth data and a second subset of the image data is not associated with a measured depth value, the method further comprising: determining a depth value for the second subset based at least in part on the depth completion algorithm.

O: One or more non-transitory computer-readable media storing instructions that, when executed, cause one or more processors to perform operations comprising: receiving image data representing an environment, the image data including a first pixel and a second pixel; receiving depth data representing the environment; projecting the depth data into the image data, wherein a first intensity value of a first pixel of the image data is associated with a first depth value of the depth data; and determining a second depth value of the second pixel based at least in part on a depth completion algorithm, the first intensity value, the first depth value, and a second intensity value of a second pixel of the image data.

P: The one or more non-transitory computer-readable media of paragraph O, wherein determining the second depth value further comprises: determining that the first pixel is within a threshold pixel distance to the second pixel; determining, based at least in part on a difference between the first intensity value and the second intensity value, a weight; and determining the second depth value based at least in part on the weight and a least squares optimization algorithm.

Q: The one or more non-transitory computer-readable media of paragraph O or P, wherein the depth completion algorithm is a least squares optimization algorithm.

R: The one or more non-transitory computer-readable media of any of paragraphs O-Q, wherein the instructions, when executed, cause the one or more processors to perform further operations comprising: inputting the image data into a machine learned (ML) model; receiving, from the ML model, instance segmentation data; associating the instance segmentation data with the depth data; for an instance of the instance segmentation data, determining a depth distribution; determining, for a first mode of the depth distribution, a first depth metric associated with the instance; determining, for a second mode of the depth distribution, a second depth metric associated with the instance; and updating the second depth metric based at least in part on the first depth metric.

S: The one or more non-transitory computer-readable media of any of paragraphs O-R, wherein the instructions, when executed, cause the one or more processors to perform further operations comprising at least one of: inputting the first depth value and the second depth value into a machine learned (ML) model to determine a bounding box associated with an object in the environment; inputting the first depth value and the second depth value into the ML model to determine a classification associated with the object in the environment; or controlling a vehicle based at least in part on the first depth value and the second depth value.

T: The one or more non-transitory computer-readable media of any of paragraphs O-S, wherein the instructions, when executed, cause the one or more processors to perform further operations comprising: determining a three-dimensional bounding box associated with an object in the environment based on the first depth value and the second depth value.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. In some examples, steps may be omitted entirely. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more computer-readable media storing instructions executable by the one or more processors, wherein the instructions, when executed, cause the system to perform operations comprising:
receiving, from an image sensor associated with a vehicle, two-dimensional image data representing an environment, the two-dimensional image data including a first pixel and a second pixel;
receiving, from a lidar sensor associated with the vehicle, depth data representing the environment;

determining that a first field of view of the image sensor at least partially overlaps a second field of view of the lidar sensor;

projecting the depth data into the two-dimensional image data, the two-dimensional image data having first and second pixels with which first and second intensity values, respectively, are associated;

determining, based at least in part on a first depth value of the depth data associated with the first pixel, and in response to the projecting of the depth data, a weight;

determining a second depth value of the second pixel based at least in part on a least squares optimization algorithm, the first and second intensity values, the first depth value, and the weight; and controlling the vehicle, based at least in part on the first depth value and the second depth value being utilized to determine one or more objects in the environment.

2. The system of claim 1, wherein
the first pixel is within a threshold pixel distance to the second pixel.

3. The system of claim 1, the instructions, when executed, cause the system to perform further operations comprising:
inputting the two-dimensional image data into a machine learned (ML) model;
receiving, from the ML model, instance segmentation data;
associating the instance segmentation data with the depth data;
for an instance of the instance segmentation data, determining a depth distribution;
determining, for a first mode of the depth distribution, a first depth metric associated with the instance;
determining, for a second mode of the depth distribution, a second depth metric associated with the instance; and
updating the second depth metric based at least in part on the first depth metric.

4. The system of claim 1, wherein the weight includes a first weight, and wherein a third intensity value of a third pixel of the two-dimensional image data is associated with a third depth value of the depth data, the instructions, when executed, cause the system to perform further operations comprising:
determining based at least in part on the first intensity value, the second intensity value, and the third intensity value, a second weight; and
determining a fourth depth value of the second pixel based at least in part on the least squares optimization algorithm, the second weight, the first depth value, and the third depth value.

5. The system of claim 1, the instructions, when executed, cause the system to perform further operations comprising:
determining a three-dimensional bounding box associated with an object in the environment based at least in part on the first depth value and the second depth value.

6. A method comprising:
receiving image data representing an environment, the image data including a first pixel and a second pixel;
receiving depth data representing the environment;
projecting, as associated data, the depth data into the image data, the image data having the first and second pixels with which first and second intensity values, respectively, in the associated data are associated, the associated data including a first depth value of the depth data associated with the first pixel;

determining, based at least in part on the associated data, and in response to the projecting of the depth data, a weight;

determining a second depth value of the second pixel based at least in part on a depth completion algorithm, the associated data, and the weight; and controlling a vehicle based at least in part on the first depth value and the second depth value being utilized to determine one or more objects in the environment.

7. The method of claim 6, wherein determining the second depth value further comprises:
determining the second depth value based at least in part on a relationship between the first intensity value the second intensity value.

8. The method of claim 6, wherein the depth completion algorithm is a least squares optimization algorithm.

9. The method of claim 6, wherein determining the second depth value further comprises:
determining that the first pixel is within a threshold pixel distance to the second pixel;
determining, based at least in part on a difference between the first intensity value and the second intensity value, a second weight; and
determining the second depth value based at least in part on the second weight and a least squares optimization algorithm.

10. The method of claim 6, further comprising:
inputting the image data into a machine learned (ML) model;
receiving, from the ML model, instance segmentation data;
associating the instance segmentation data with the depth data;
for an instance of the instance segmentation data, determining a depth distribution;
determining, for a first mode of the depth distribution, a first depth metric associated with the instance;
determining, for a second mode of the depth distribution, a second depth metric associated with the instance; and
updating the second depth metric based at least in part on the first depth metric.

11. The method of claim 6, wherein the image data is received from an image sensor, and the depth data is received from a lidar sensor, and
the depth data is projected into the image data based at least in part on determining that a first field of view of the image sensor at least partially overlaps a second field of view of the lidar sensor.

12. The method of claim 6, further comprising:
determining a third intensity value of a point of the depth data, the third intensity value being associated with a third pixel that corresponds to the point; and
determining the second depth value of the second pixel further based at least in part on the third intensity value.

13. The method of claim 6, wherein projecting the depth data into the image data further comprises projecting, based at least in part on a transformation, the depth data into the image data.

14. The method of claim 6, wherein a first subset of the image data is associated with the depth data and a second subset of the image data is not associated with a measured depth value, the method further comprising:
determining a depth value for the second subset based at least in part on the depth completion algorithm.

15. One or more non-transitory computer-readable media storing instructions that, when executed, cause one or more processors to perform operations comprising:

receiving image data representing an environment, the image data including a first pixel and a second pixel;

receiving depth data representing the environment;

projecting the depth data into the image data, the image data having the first and second pixels with which first and second intensity values, respectively, are associated;

determining, based at least in part on a first depth value of the depth data associated with the first pixel, and in response to the projecting of the depth data, a weight;

determining a second depth value of the second pixel based at least in part on a depth completion algorithm, the first and second intensity values, the first depth value, and the weight; and causing a vehicle to be controlled, based at least in part on the first depth value and the second depth value being utilized to determine one or more objects in the environment.

16. The one or more non-transitory computer-readable media of claim 15, wherein determining the second depth value further comprises:

determining that the first pixel is within a threshold pixel distance to the second pixel;

determining, based at least in part on a difference between the first intensity value and the second intensity value, a second weight; and determining the second depth value based at least in part on the second weight and a least squares optimization algorithm.

17. The one or more non-transitory computer-readable media of claim 15, wherein the depth completion algorithm is a least squares optimization algorithm.

18. The one or more non-transitory computer-readable media of claim 15, wherein the instructions, when executed, cause the one or more processors to perform further operations comprising:

inputting the image data into a machine learned (ML) model;

receiving, from the ML model, instance segmentation data;

associating the instance segmentation data with the depth data;

for an instance of the instance segmentation data, determining a depth distribution;

determining, for a first mode of the depth distribution, a first depth metric associated with the instance;

determining, for a second mode of the depth distribution, a second depth metric associated with the instance; and updating the second depth metric based at least in part on the first depth metric.

19. The one or more non-transitory computer-readable media of claim 15, wherein the instructions, when executed, cause the one or more processors to perform further operations comprising at least one of:

inputting the first depth value and the second depth value into a machine learned (ML) model to determine a bounding box associated with an object in the environment; or inputting the first depth value and the second depth value into the ML model to determine a classification associated with the object in the environment.

20. The one or more non-transitory computer-readable media of claim 15, wherein the instructions, when executed, cause the one or more processors to perform further operations comprising:

determining a three-dimensional bounding box associated with an object in the environment based at least in part on the first depth value and the second depth value.

* * * * *